(12) United States Patent
Pietilä

(10) Patent No.: US 9,262,670 B2
(45) Date of Patent: Feb. 16, 2016

(54) ADAPTIVE REGION OF INTEREST

(75) Inventor: Sami Aleksi Pietilä, Oulu (FI)

(73) Assignee: GOOGLE INC., Mountain View, CA (US)

(*) Notice: Subject to any disclaimer, the term of this patent is extended or adjusted under 35 U.S.C. 154(b) by 774 days.

(21) Appl. No.: 13/370,530

(22) Filed: Feb. 10, 2012

(65) Prior Publication Data
US 2013/0208784 A1 Aug. 15, 2013

(51) Int. Cl.
| | |
|---|---|
| H04N 7/26 | (2006.01) |
| G06K 9/46 | (2006.01) |
| G06K 9/00 | (2006.01) |
| H04N 19/137 | (2014.01) |
| H04N 19/17 | (2014.01) |
| H04N 19/167 | (2014.01) |
| G06K 9/34 | (2006.01) |
| H04N 11/20 | (2006.01) |
| H04N 19/124 | (2014.01) |

(52) U.S. Cl.
CPC .......... *G06K 9/00234* (2013.01); *H04N 19/137* (2014.11); *H04N 19/167* (2014.11); *H04N 19/17* (2014.11); *H04N 19/124* (2014.11)

(58) Field of Classification Search
CPC ............. H04N 7/26; H04N 7/12; G06K 9/46; G06K 9/00; G06K 9/36; G06K 9/34
USPC .......... 375/240.02, 240.03, 240.05; 382/168, 382/232–253
See application file for complete search history.

(56) References Cited

U.S. PATENT DOCUMENTS

| | | | |
|---|---|---|---|
| 3,825,832 A | 7/1974 | Frei et al. | |
| 4,463,372 A * | 7/1984 | Bennett et al. | ................ 348/580 |
| 4,710,810 A | 12/1987 | Koga | |
| 4,719,642 A | 1/1988 | Lucas | |
| 4,729,127 A | 3/1988 | Chan et al. | |
| 4,736,446 A | 4/1988 | Reynolds et al. | |
| 4,816,906 A | 3/1989 | Kummerfeldt et al. | |
| 4,868,764 A | 9/1989 | Richards | |
| 4,891,748 A | 1/1990 | Mann | |

(Continued)

FOREIGN PATENT DOCUMENTS

| | | |
|---|---|---|
| EP | 1351510 | 10/2003 |
| GB | 2350515 | 11/2000 |

(Continued)

OTHER PUBLICATIONS

Bankoski et al. "Technical Overview of VP8, an Open Source Video Codec for the Web". Dated Jul. 11, 2011.

(Continued)

*Primary Examiner* — Chikaodili E. Anyikire
*Assistant Examiner* — Dramos I Kalapodas
(74) *Attorney, Agent, or Firm* — Young Basile Hanlon & MacFarlane P.C.

(57) ABSTRACT

This disclosure relates to adaptively determining and improving the quality of a region of interest in video content. A region inspection component inspects regions of an image. A detection component determines chroma values contained in the regions. A comparison component compares the chroma values against a set of predetermined chroma values, and determines, based on the comparison, a set of regions of interest in the frame. An encoder encodes the regions of interest in the image at a higher or better quality than a remainder of the image.

17 Claims, 11 Drawing Sheets

(56) References Cited

U.S. PATENT DOCUMENTS

| | | | |
|---|---|---|---|
| 5,068,724 A | 11/1991 | Krause et al. | |
| 5,083,214 A | 1/1992 | Knowles | |
| 5,091,782 A | 2/1992 | Krause et al. | |
| 5,136,371 A | 8/1992 | Savatier et al. | |
| 5,136,376 A | 8/1992 | Yagasaki et al. | |
| 5,148,269 A | 9/1992 | de Haan et al. | |
| 5,164,819 A | 11/1992 | Music | |
| 5,231,484 A | 7/1993 | Gonzales et al. | |
| 5,270,812 A | 12/1993 | Richards | |
| 5,274,442 A | 12/1993 | Murakami et al. | |
| 5,313,306 A | 5/1994 | Kuban et al. | |
| 5,337,086 A | 8/1994 | Fujinami | |
| 5,341,440 A | 8/1994 | Earl et al. | |
| 5,374,958 A | 12/1994 | Yanagihara | |
| 5,398,068 A | 3/1995 | Liu et al. | |
| 5,432,870 A | 7/1995 | Schwartz | |
| 5,461,423 A | 10/1995 | Tsukagoshi | |
| 5,463,701 A | 10/1995 | Kantner, Jr. et al. | |
| 5,512,952 A | 4/1996 | Iwamura | |
| 5,561,475 A | 10/1996 | Jung | |
| 5,561,477 A | 10/1996 | Polit | |
| 5,576,767 A | 11/1996 | Lee et al. | |
| 5,589,945 A | 12/1996 | Abecassis | |
| 5,596,370 A | 1/1997 | Jung | |
| 5,659,539 A | 8/1997 | Porter et al. | |
| 5,666,461 A | 9/1997 | Igarashi et al. | |
| 5,686,962 A | 11/1997 | Chung et al. | |
| 5,696,869 A | 12/1997 | Abecassis | |
| 5,734,744 A | 3/1998 | Wittenstein et al. | |
| 5,737,020 A | 4/1998 | Hall et al. | |
| 5,748,247 A | 5/1998 | Hu | |
| 5,767,909 A | 6/1998 | Jung | |
| 5,768,533 A | 6/1998 | Ran | |
| 5,774,593 A | 6/1998 | Zick et al. | |
| 5,777,680 A | 7/1998 | Kim | |
| 5,793,647 A | 8/1998 | Hageniers et al. | |
| 5,818,536 A | 10/1998 | Morris et al. | |
| 5,818,969 A | 10/1998 | Astle | |
| 5,828,370 A | 10/1998 | Moeller et al. | |
| 5,886,742 A | 3/1999 | Hibi et al. | |
| 5,903,264 A | 5/1999 | Moeller et al. | |
| 5,929,940 A | 7/1999 | Jeannin | |
| 5,930,379 A | 7/1999 | Rehg et al. | |
| 5,930,493 A | 7/1999 | Ottesen et al. | |
| 5,963,203 A | 10/1999 | Goldberg et al. | |
| 5,991,447 A | 11/1999 | Eifrig et al. | |
| 5,999,641 A | 12/1999 | Miller et al. | |
| 5,999,655 A | 12/1999 | Kalker et al. | |
| 6,005,980 A | 12/1999 | Eifrig et al. | |
| 6,011,872 A | 1/2000 | Qian et al. | |
| 6,014,706 A | 1/2000 | Cannon et al. | |
| 6,026,183 A | 2/2000 | Talluri et al. | |
| 6,035,060 A | 3/2000 | Chen et al. | |
| 6,035,067 A | 3/2000 | Ponticos | |
| 6,041,145 A | 3/2000 | Hayashi et al. | |
| 6,055,330 A | 4/2000 | Eleftheriadis et al. | |
| 6,061,397 A | 5/2000 | Ogura | |
| 6,075,875 A | 6/2000 | Gu | |
| 6,084,908 A | 7/2000 | Chiang et al. | |
| 6,108,383 A | 8/2000 | Miller et al. | |
| 6,112,234 A | 8/2000 | Leiper | |
| 6,115,501 A | 9/2000 | Chun et al. | |
| 6,119,154 A | 9/2000 | Weaver et al. | |
| 6,125,144 A | 9/2000 | Matsumura et al. | |
| 6,141,381 A | 10/2000 | Sugiyama | |
| 6,167,164 A | 12/2000 | Lee | |
| 6,178,204 B1 * | 1/2001 | Hazra | H04N 21/4728 375/240.25 |
| 6,181,822 B1 | 1/2001 | Miller et al. | |
| 6,185,363 B1 | 2/2001 | Dimitrova et al. | |
| 6,188,799 B1 | 2/2001 | Tan et al. | |
| 6,212,234 B1 | 4/2001 | Andoh et al. | |
| 6,222,174 B1 | 4/2001 | Tullis et al. | |
| 6,240,135 B1 | 5/2001 | Kim | |
| 6,249,613 B1 | 6/2001 | Crinon et al. | |
| 6,249,614 B1 | 6/2001 | Kolesnik et al. | |
| 6,256,423 B1 | 7/2001 | Krishnamurthy et al. | |
| 6,271,890 B1 * | 8/2001 | Tamir et al. | 348/587 |
| 6,272,179 B1 | 8/2001 | Kadono | |
| 6,275,614 B1 | 8/2001 | Krishnamurthy et al. | |
| 6,289,049 B1 | 9/2001 | Kim et al. | |
| 6,292,837 B1 | 9/2001 | Miller et al. | |
| 6,327,304 B1 | 12/2001 | Miller et al. | |
| 6,337,917 B1 | 1/2002 | Onural et al. | |
| 6,359,929 B1 | 3/2002 | Boon | |
| 6,370,267 B1 | 4/2002 | Miller et al. | |
| 6,377,709 B1 | 4/2002 | Guillotel | |
| 6,381,277 B1 | 4/2002 | Chun et al. | |
| 6,400,763 B1 | 6/2002 | Wee | |
| 6,414,995 B2 | 7/2002 | Okumura et al. | |
| 6,418,166 B1 | 7/2002 | Wu et al. | |
| 6,427,028 B1 | 7/2002 | Donescu et al. | |
| 6,473,463 B2 | 10/2002 | Agarwal | |
| 6,501,860 B1 | 12/2002 | Charrier et al. | |
| 6,522,784 B1 | 2/2003 | Zlotnick | |
| 6,526,097 B1 | 2/2003 | Sethuraman et al. | |
| 6,529,638 B1 | 3/2003 | Westerman | |
| 6,560,366 B1 | 5/2003 | Wilkins | |
| 6,570,924 B1 | 5/2003 | Lynch et al. | |
| 6,661,842 B1 | 12/2003 | Abousleman | |
| 6,661,925 B1 | 12/2003 | Pianykh et al. | |
| 6,687,303 B1 | 2/2004 | Ishihara | |
| 6,697,061 B1 | 2/2004 | Wee et al. | |
| 6,707,952 B1 | 3/2004 | Tan et al. | |
| 6,711,211 B1 | 3/2004 | Lainema | |
| 6,735,249 B1 | 5/2004 | Karczewicz et al. | |
| 6,754,266 B2 | 6/2004 | Bahl et al. | |
| 6,757,426 B2 * | 6/2004 | Link | G06K 9/2018 358/523 |
| 6,757,434 B2 * | 6/2004 | Miled et al. | 382/236 |
| 6,765,964 B1 | 7/2004 | Conklin | |
| 6,826,229 B2 | 11/2004 | Kawashima et al. | |
| 6,909,749 B2 | 6/2005 | Yang et al. | |
| 6,934,419 B2 | 8/2005 | Zlotnick | |
| 6,985,526 B2 | 1/2006 | Bottreau et al. | |
| 6,985,527 B2 | 1/2006 | Gunter et al. | |
| 6,987,866 B2 | 1/2006 | Hu | |
| 7,010,032 B1 | 3/2006 | Kikuchi et al. | |
| 7,027,506 B2 | 4/2006 | Lee et al. | |
| 7,027,654 B1 | 4/2006 | Ameres et al. | |
| 7,076,113 B2 | 7/2006 | Le Dinh | |
| 7,085,319 B2 | 8/2006 | Prakash et al. | |
| 7,116,831 B2 | 10/2006 | Mukerjee et al. | |
| 7,136,534 B2 | 11/2006 | Thyagarajan et al. | |
| 7,143,352 B2 | 11/2006 | Divakaran et al. | |
| 7,170,937 B2 | 1/2007 | Zhou | |
| 7,226,150 B2 | 6/2007 | Yoshimura et al. | |
| 7,227,977 B1 | 6/2007 | Dotsenko | |
| 7,236,524 B2 | 6/2007 | Sun et al. | |
| 7,263,125 B2 | 8/2007 | Lainema | |
| 7,330,509 B2 | 2/2008 | Lu et al. | |
| 7,499,492 B1 | 3/2009 | Ameres et al. | |
| 7,599,435 B2 | 10/2009 | Marpe et al. | |
| 8,116,374 B2 | 2/2012 | Gordon et al. | |
| 8,155,454 B2 * | 4/2012 | Raveendran | 382/232 |
| 8,233,676 B2 | 7/2012 | Ngan et al. | |
| 8,243,797 B2 * | 8/2012 | Lin et al. | 375/240.05 |
| 8,311,355 B2 * | 11/2012 | Brunner | G06T 5/008 348/222.1 |
| 8,503,536 B2 * | 8/2013 | Zuo et al. | 375/240.2 |
| 8,605,945 B2 * | 12/2013 | El-Maleh | G06K 9/00234 382/103 |
| 2001/0022815 A1 | 9/2001 | Agarwal | |
| 2002/0012471 A1 | 1/2002 | Nayyar | |
| 2002/0031272 A1 | 3/2002 | Bagni et al. | |
| 2002/0034245 A1 * | 3/2002 | Sethuraman | H04N 19/50 375/240.03 |
| 2002/0036705 A1 | 3/2002 | Lee et al. | |
| 2002/0080871 A1 | 6/2002 | Fallon et al. | |
| 2002/0136448 A1 | 9/2002 | Bortolussi et al. | |
| 2002/0168114 A1 | 11/2002 | Valente | |
| 2002/0172289 A1 | 11/2002 | Akiyoshi et al. | |
| 2003/0081850 A1 | 5/2003 | Karczewicz et al. | |
| 2003/0095598 A1 | 5/2003 | Lee et al. | |

(56) References Cited

U.S. PATENT DOCUMENTS

| | | |
|---|---|---|
| 2003/0123545 A1 | 7/2003 | Prakash et al. |
| 2003/0161399 A1 | 8/2003 | Ali |
| 2003/0202594 A1 | 10/2003 | Lainema |
| 2004/0013308 A1 | 1/2004 | Jeon et al. |
| 2004/0120398 A1 | 6/2004 | Zhang et al. |
| 2004/0120400 A1 | 6/2004 | Linzer |
| 2004/0131117 A1 | 7/2004 | Sheraizin et al. |
| 2004/0156549 A1 | 8/2004 | Persiantsev |
| 2004/0179820 A1 | 9/2004 | Kashiwagi et al. |
| 2004/0208392 A1 | 10/2004 | Raveendran et al. |
| 2004/0228410 A1 | 11/2004 | Ameres et al. |
| 2004/0240556 A1 | 12/2004 | Winger et al. |
| 2004/0252886 A1 | 12/2004 | Pan et al. |
| 2005/0013494 A1 | 1/2005 | Srinivasan et al. |
| 2005/0046702 A1 | 3/2005 | Katayama et al. |
| 2005/0111744 A1 | 5/2005 | Kupeev et al. |
| 2005/0147165 A1 | 7/2005 | Yoo et al. |
| 2005/0152456 A1 | 7/2005 | Orchard et al. |
| 2005/0169374 A1 | 8/2005 | Marpe et al. |
| 2005/0180506 A1 | 8/2005 | Wittebrood et al. |
| 2005/0206785 A1 | 9/2005 | Swan et al. |
| 2005/0232351 A1 | 10/2005 | Jung |
| 2005/0265447 A1 | 12/2005 | Park |
| 2005/0276497 A1 | 12/2005 | Chen et al. |
| 2006/0098737 A1 | 5/2006 | Sethuraman et al. |
| 2006/0114996 A1 | 6/2006 | Thoreau et al. |
| 2006/0126739 A1 | 6/2006 | Stoner |
| 2006/0155398 A1 | 7/2006 | Hoffberg et al. |
| 2006/0204113 A1* | 9/2006 | Wang ............. H04N 19/147 382/236 |
| 2006/0215758 A1 | 9/2006 | Kawashima |
| 2006/0239345 A1 | 10/2006 | Taubman et al. |
| 2006/0257048 A1 | 11/2006 | Lin et al. |
| 2007/0076947 A1* | 4/2007 | Wang et al. ............. 382/165 |
| 2007/0110290 A1 | 5/2007 | Chang et al. |
| 2007/0115156 A1 | 5/2007 | Lim et al. |
| 2007/0140342 A1 | 6/2007 | Karczewicz et al. |
| 2007/0140346 A1 | 6/2007 | Chen et al. |
| 2007/0165958 A1 | 7/2007 | Picard |
| 2007/0171974 A1 | 7/2007 | Baik |
| 2007/0183661 A1* | 8/2007 | El-Maleh ........... G06K 9/00234 382/173 |
| 2007/0183662 A1* | 8/2007 | Wang ............ G06K 9/00248 382/173 |
| 2007/0183663 A1* | 8/2007 | Wang ............ G06K 9/00234 382/173 |
| 2007/0236513 A1 | 10/2007 | Hedenstroem et al. |
| 2008/0008398 A1 | 1/2008 | Tanaka et al. |
| 2008/0056347 A1 | 3/2008 | Chiu et al. |
| 2008/0151997 A1 | 6/2008 | Oguz |
| 2008/0152245 A1* | 6/2008 | El-Maleh et al. ............. 382/254 |
| 2008/0170793 A1 | 7/2008 | Yamada et al. |
| 2008/0175475 A1 | 7/2008 | Sung |
| 2008/0212678 A1 | 9/2008 | Booth et al. |
| 2008/0246884 A1 | 10/2008 | Chung |
| 2009/0034619 A1 | 2/2009 | Mukherjee et al. |
| 2009/0097543 A1* | 4/2009 | Pan et al. .............. 375/240.1 |
| 2009/0103617 A1 | 4/2009 | Au et al. |
| 2009/0161767 A1* | 6/2009 | Jang ............. H04N 19/176 375/240.24 |
| 2009/0161938 A1 | 6/2009 | Shekhar et al. |
| 2009/0226044 A1 | 9/2009 | Ngan et al. |
| 2009/0262835 A1 | 10/2009 | Srinivasan et al. |
| 2009/0278961 A1* | 11/2009 | Mohanty et al. ............. 348/241 |
| 2009/0296814 A1 | 12/2009 | Lin et al. |
| 2009/0324121 A1* | 12/2009 | Bhagavathy et al. ......... 382/260 |
| 2010/0054344 A1 | 3/2010 | Puri et al. |
| 2010/0061444 A1 | 3/2010 | Wilkins et al. |
| 2010/0061461 A1 | 3/2010 | Bankoski et al. |
| 2010/0208812 A1 | 8/2010 | Murakami et al. |
| 2010/0246939 A1 | 9/2010 | Aisaka et al. |
| 2010/0246951 A1 | 9/2010 | Chen et al. |
| 2010/0272173 A1 | 10/2010 | Puri et al. |
| 2010/0278271 A1 | 11/2010 | MacInnis |
| 2010/0303150 A1 | 12/2010 | Hsiung et al. |
| 2010/0328538 A1 | 12/2010 | Al-Kadi et al. |
| 2011/0007977 A1 | 1/2011 | Amonou et al. |
| 2011/0182352 A1 | 7/2011 | Pace |
| 2011/0182509 A1 | 7/2011 | Free |
| 2011/0188579 A1 | 8/2011 | Lin et al. |
| 2011/0243249 A1* | 10/2011 | Lee .............. H04N 19/176 375/240.25 |
| 2011/0249756 A1 | 10/2011 | Doepke |
| 2012/0020407 A1* | 1/2012 | Liu et al. ............ 375/240.01 |
| 2012/0128067 A1* | 5/2012 | Liu ............. H04N 19/159 375/240.12 |
| 2012/0155532 A1 | 6/2012 | Puri et al. |
| 2013/0148729 A1 | 6/2013 | Sasai et al. |

FOREIGN PATENT DOCUMENTS

| | | |
|---|---|---|
| GB | 2371434 | 7/2002 |
| JP | 2217088 | 8/1990 |
| JP | 8280032 | 10/1996 |
| JP | 11262018 | 9/1999 |
| JP | 11289544 | 10/1999 |
| JP | 11313332 | 11/1999 |
| JP | 11513205 | 11/1999 |
| JP | 2007036888 | 2/2007 |
| KR | 100213018 | 8/1999 |
| KR | 200130916 | 4/2001 |
| KR | 20060035542 | 4/2006 |
| WO | WO0150770 | 7/2001 |
| WO | WO0207164 | 1/2002 |
| WO | WO03026315 | 3/2003 |
| WO | WO03041405 | 5/2003 |
| WO | WO2006078115 | 7/2006 |
| WO | WO2008002491 | 1/2008 |

OTHER PUBLICATIONS

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Carreira, Joao et al. "Constrained Parametric Min-Cuts for Automatic Object Segmentation", 2010 IEEE Conference on Computer Vision and Pattern Recognition (CVPR), San Francisco, CA, Jun. 13-18, 2010.

Chen et al. (Predictive Video Decoding Based on Ordinal Depth of Moing Regions, IEEE Proceedings of ICC 2010).

Flexible Macroblock Ordering; Wikipedia; Jul. 15, 2008.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Lee et al, Bit Allocation for MPEG-4 Video Coding with Spatio-Temporal Tradeoffs, Jun. 2003, pp. 488-502, [retrieved from Internet on Jun. 19, 2011] <URL:http://ieeexplore.ieee.org/stamp/stamp.jsp?tp=&arnumber=1207406>.

M. Bierling, Displacement estimation by hierarchical blockmatching. 1998, in Proceedings of SPIE Visual Communications and Image Processing 88, p. 942-951.

Marcos Nieto, Luis Salgado, Narciso Garcia; Fast Mode Decision Based on Activity Segmentation in H.264/AVC Encoding; Grupo de Tratamiento de Imagenes—E.T.S. Ingenieros de Telecomunicacion, Universidad Politecnica de Madrid, Spain; Springer-Verlag Berlin Heidelberg 2006.

Moschetti et al, Automatic Object Extraction and Dynamic Bitrate Allocation for Second Generation Video Coding, Multimedia and Expo, 2002. ICME '02 Proceedings. 2002 IEEE International Conference on Lausanne, Switzerland, Aug. 26, 2002, pp. 493-496, vol. 1,Piscataway, New Jersey, USA.

Nunes P. et al, Rate Control for Scenes with Multiple Arbitrarily Shaped Video Objects, ITG Fachberichte, Jan. 1, 1997, pp. 303-308, Berlin, Germany.

ON2 Technologies Inc., White Paper TrueMotion VP7 Video Codec, Jan. 10, 2005, 13 pages, Document Version: 1.0, Clifton Park, New York.

(56) References Cited

OTHER PUBLICATIONS

Overview; VP7 Data Format and Decoder. Version 1.5. On2 Technologies, Inc. Dated Mar. 28, 2005.
Paul et al. ("Video coding focusing on block partitioning and occlusion," IEEE Transactions on Image Processing, vol. 19, No. 3, Mar. 2010, 691-701)-discloses pattern-based coding that divides a frame using different block shapes and sizes.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Sikora, T. et al., Shape-adaptive DCT for generic coding of video, Circuits and Systems for Video Technology, IEEE Transactions on vol. 5, Issue 1, p. 59-62, Feb 1, 1995.
Sun Y et al, Asynchronous Rate Control for Multi-Object Videos, IEEE Transactions on Circuits and Systems for Video Technology, Aug. 1, 2005, pp. 1007-1018, vol. 15, No. 8 [retrieved from Internet on Jul. 19, 2011] <URL: http://ieeexplore.ieee.org/stamp/stamp.jsp?tp=&arnumber=1490554>.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Wiegand et al, "Overview of the H 264/AVC Video Coding Standard," IEEE Transactions on Circuits and Systems for Video Technology, vol. 13, No. 7, pp. 568, 569, Jul. 1, 2003.
Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.
Giovani Gomez, et al., Automatic Feature Constructions and a Simple Rule Induction Algorithm for Skin Detection, ITESM Capus Cuernavaca, Paseo de la Reforma 182—A, Temixo, Morelos 62589, Mexico, 8 pages.
Tarek M. Mahmoud, A New Fast Skin Color Detection Technique, World Academy of Science, Engineering and Technology 43 2008, 5 pages.
Jure Kovac, et al., Human Skin Colour Clustering for Face Detection, University of Ljubljana, Slovenia, 5 pages.
Vladimir Vezhnevets, et al., A Survey on Pixel-Based Skin Color Detection Techniques, Graphics and Media Laboratory, Moscow Russia, 8 pages.
International Search Report and Written Opinion of the International Searching Authority for International Application No. PCT/US13/24782, dated Apr. 16, 2013, 19 pages.
ISO/IEC: "information Technology—Coding of audio-visual objects" Retrieved from the Internet: Http://kazus.ru/nuke/modules/downloads/pub/144/0/ISO-IEC-14496-2-2001.
Pascal Fleury et al: "MPEG-4 video verification model: A solution for interactive multimedia applications" Journal of Electronic Imaging, SPIE/IS&T; Engineering Information Inc.; vol. 7, Jul. 1, 1998, pp. 502-515.

\* cited by examiner

ADAPTIVE REGION OF INTEREST

TECHNICAL FIELD

This disclosure generally relates to systems and methods that facilitate adaptively determining and improving the quality of a region of interest in video content.

BACKGROUND

Video conferencing allows people at two or more locations to interact simultaneously via video and audio transmissions. In the past, video conferencing was largely limited to enterprise use. However, the growth of the internet and wireless communication networks, coupled with declining bandwidth cost, has made video conferencing more accessible than ever before. A number of services exist that provide low bandwidth video conferencing to consumers using the internet or wireless communication networks. In addition, the rapid growth of mobile communication devices that include cameras, such as smart phones and tablet computers, enable consumers to video conference at virtually any time from anywhere in the world.

Typically, video conferencing is a bandwidth intensive process that requires transmission and reception of large amounts of video and audio information. Low bandwidth video conferencing mitigates bandwidth requirements in part by applying high compression to the video transmission. However, heavily compressing the video reduces the overall quality of the observed video. The reduction in quality is often readily apparent with respect to human faces. People can be rendered unrecognizable due to the high compression rates employed in low bandwidth video conferencing.

High bandwidth or high definition video conferencing can provide high quality observed video. However, these techniques can require special communication infrastructures that are not readily available or affordable. In addition, common techniques for facial detection and/or enhancement can be computationally expensive, and may not be well suited for video conferencing.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

According to an aspect of the subject innovation, systems and methods for adaptively determining and improving the quality of a region of interest in video content are disclosed. Chroma values contained in respective regions of an image are determined. The chroma values are compared against a set of chroma values corresponding to human skin tones, and regions of the image having a chroma value corresponding to a human skin tone are included in a set of regions of interest. An encoder encodes the regions of interest included in the image at a higher or better quality than a remainder of the image.

In one embodiment, a region inspection component examines regions of a frame, and a detection component determines chroma values contained in the regions of the frame. A comparison component compares the chroma values against a set of predetermined chroma values, and determines, based on the comparison, a set of regions of interest in the frame.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
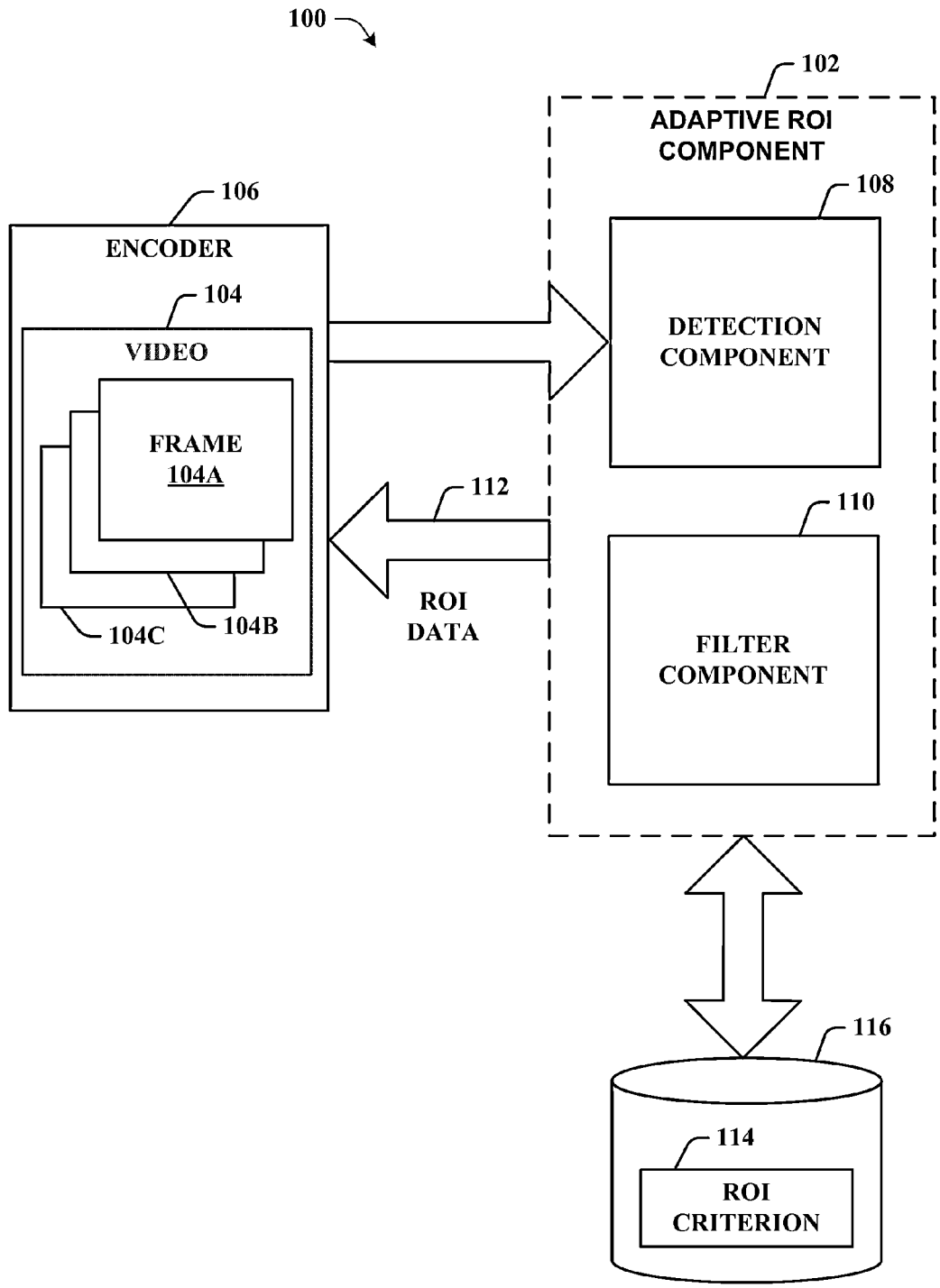
FIG. 1 illustrates an example system for determining regions of interest in images in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As noted in the Background section, conventional techniques for facial detection and/or enhancement can be computationally expensive and not well suited for video conferencing. One non-limiting implementation of the innovation provides efficient and accurate facial detection and/or enhancement for video conferencing. The implementation adaptively determines regions of an image corresponding to skin tones, and provides data regarding the regions to an encoder. The encoder encodes the regions at a higher or better quality than a remainder of the image.

More particularly, in accordance with an embodiment, a region inspection component examines regions of a frame, and a detection component determines chroma values contained in the regions of the frame. A comparison component compares the chroma values against a set of predetermined chroma values, and determines, based on the comparison, a set of regions of interest in the frame.

Non-Limiting Examples of Adaptive Determination of Regions of Interest in Images Turning now to FIG. 1, illustrated is an example system 100 for adaptively determining regions of interest in images in accordance with various aspects described in this disclosure. Generally, system 100 can include a memory that stores computer executable components and a processor that executes computer executable components stored in the memory, examples of which can be found with reference to FIG. 11. System 100 includes an adaptive region(s) of interest component 102 (ROI component 102). The ROI component 102 obtains, acquires, or otherwise receives a frame (e.g., image data, photographic data, etc.) included in a set of frames (e.g., video). For example, in an implementation, the ROI component 102 receives, at a first time, a first frame 104A included in a video 104 (or video conference transmission), and receives other frames in the video 104 at predetermined time intervals after the first time (e.g., a predetermined frame rate). For instance, the ROI component 102 can receive a second frame 104B at a second time after the first time, and a third frame 104C at a third time after the second time. The ROI component 102 determines regions of interest (ROI) in respective frames included in the video 104, and provides data (e.g., location, identity, etc.) regarding the region(s) of interest to an encoder 106. It is to be appreciated that aspects of the innovation are not limited by a number of frames included in the video 104. For example, the video 104 can include X frames, where X is an integer.

The ROI component 102 includes a detection component 108 and a filter component 110. The detection component 108 inspects, examines, or otherwise analyzes regions (e.g., macroblocks, etc.) of a frame, and determines a set of regions included in the frame that satisfy a set of ROI criteria 114 (potential regions of interest or potential ROI). The set of ROI criteria 114 can include but are not limited to inclusion, presence, or occurrence of predetermined chroma values associated with an object to be detected. For example, in an implementation, the detection component 108 maps regions of the frame based on satisfaction of the set of ROI criteria 114.

The filter component 110 filters out regions included in the set of potential ROI based on a set of filtering criteria, and generates a set of ROI data 112 based on the filtered set of potential ROI. The set of filtering criteria can include but is not limited to having a variance satisfying a predetermined threshold. For example, in one implementation, the filter component 110 filters out regions included in the set of potential ROI that have a variance below the predetermined threshold. The ROI data 112 indicates ROI and/or regions of non-interest (RONI) included in the frame. For example, in an implementation, the filter component 110 generates an image map (e.g., ROI data 112 or using ROI data 112) indicating whether respective regions of the frame include ROI and/or RONI. It is to be appreciated that although the ROI criteria 114 are illustrated as being maintained in the data store 116 such implementation is not so limited. For example, the ROI criteria 114 can be maintained in the ROI component 102, or at a different location where the ROI component 102 may access the ROI criteria 114, for example, via a network connection.

The encoder 106 converts, alters, or otherwise encodes frames included in the video 104 based at least in part on ROI data 112 associated with at least one frame included in the video 104. For example, in an implementation, the encoder 106 encodes ROI in the frame at a higher, better, or otherwise superior quality than RONI in the frame. It is to be appreciated that although the encoder 106 is illustrated as being different from the ROI component 102, such implementation is not so limited. For example, the ROI component 102 can be included in, associated with, or execute on top of, the encoder 106.

Figure 2:
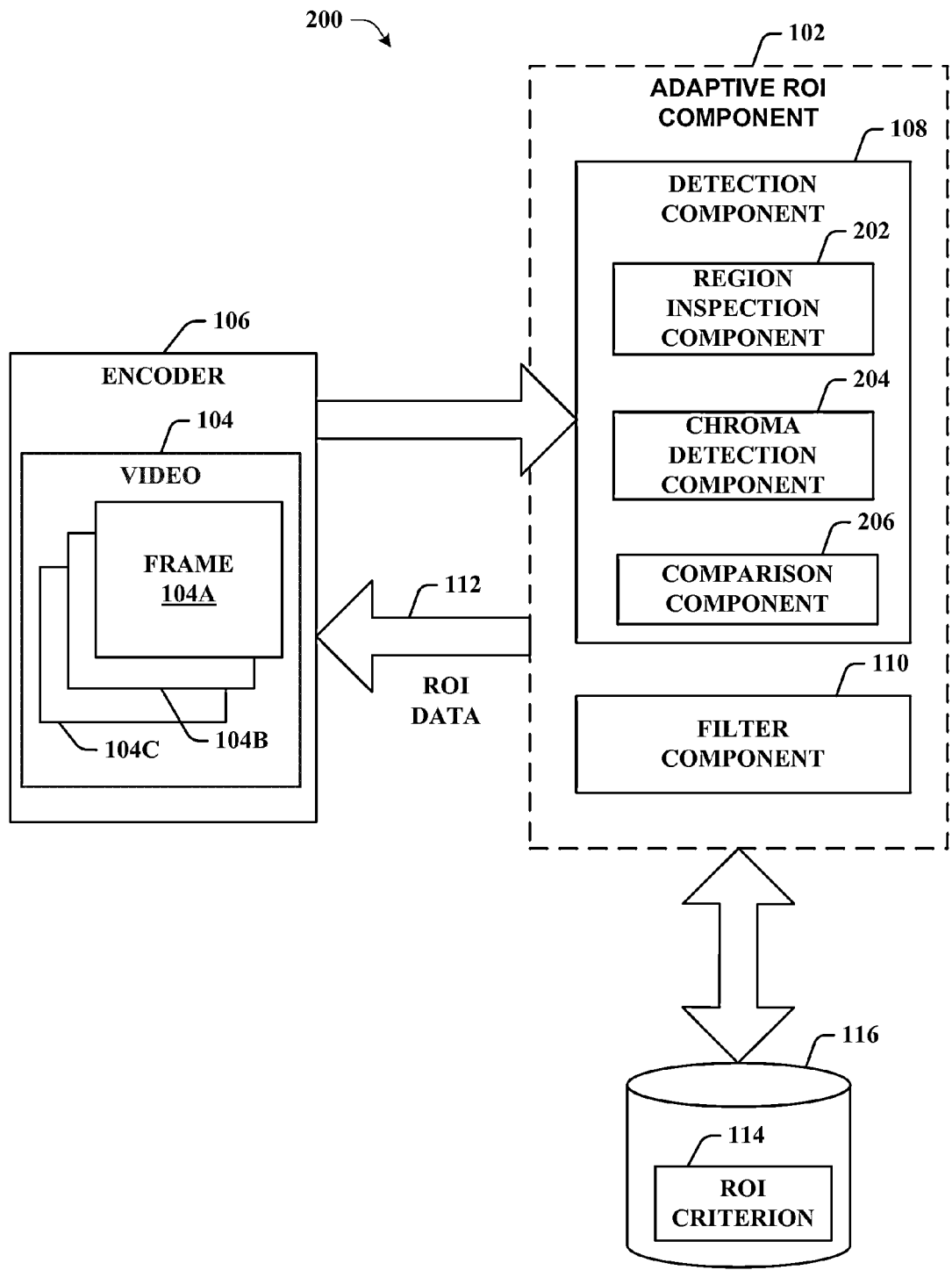
FIG. 2 illustrates an example system for determining regions of interest in images in accordance with various aspects described in this disclosure.

FIG. 2 illustrates an example system 200 for adaptively determining regions of interest in images in accordance with various aspects described in this disclosure. The system 200 includes an adaptive region(s) of interest component 102 (ROI component 102). As discussed, the ROI component 102 receives a frame (e.g., frame 104A included in a video 104), and provides data regarding regions of interest (ROI) in the frame to an encoder 106. The ROI component 102 in FIG. 2 includes a detection component 108 and a filter component 110. As discussed, the detection component 108 analyzes regions (e.g., macroblocks, etc.) of the frame, and determines a set of regions that satisfy a set of ROI criteria 114. The detection component 108 in FIG. 2 includes a region inspection component 202, a chroma detection component 204, and a comparison component 206.

The region inspection component 202 inspects, examines, or otherwise analyzes respective regions of the frame. For example, in an implementation, regions of the frame are divided into respective macroblocks, and the region inspection component 202 analyzes the respective macroblocks associated with the frame. The chroma detection component 204 identifies, detects, or otherwise determines chroma values of/included in the respective regions (e.g., macroblocks). The comparison component 206 identifies, detects, or otherwise determines regions having chroma values that satisfy the set of ROI criteria 114, and includes the determined regions in a set of potential ROI. For example, in an implementation, the set of ROI criteria 114 includes but is not limited to matching at least one chroma value included in a set of predetermined chroma values. For example, the comparison component 206 may determine regions having chroma values that match one or more chroma values in the set of predetermined chroma values, and include the regions having at least one matching chroma value in the set of potential ROI.

The filter component 110 filters out regions included in the set of potential ROI based on a set of filtering criteria, and generates ROI data 112 for the frame based on the filtered set of potential ROI. For example, in an implementation, the filter component 110 filters out regions having a variance below a predetermined threshold, and generates the ROI data 112 using the remaining regions in the filtered set of potential ROI. As discussed, the encoder 106 encodes frames in the video 104 based at least in part on ROI data 112 associated with at least one frame in the video.

Figure 3:
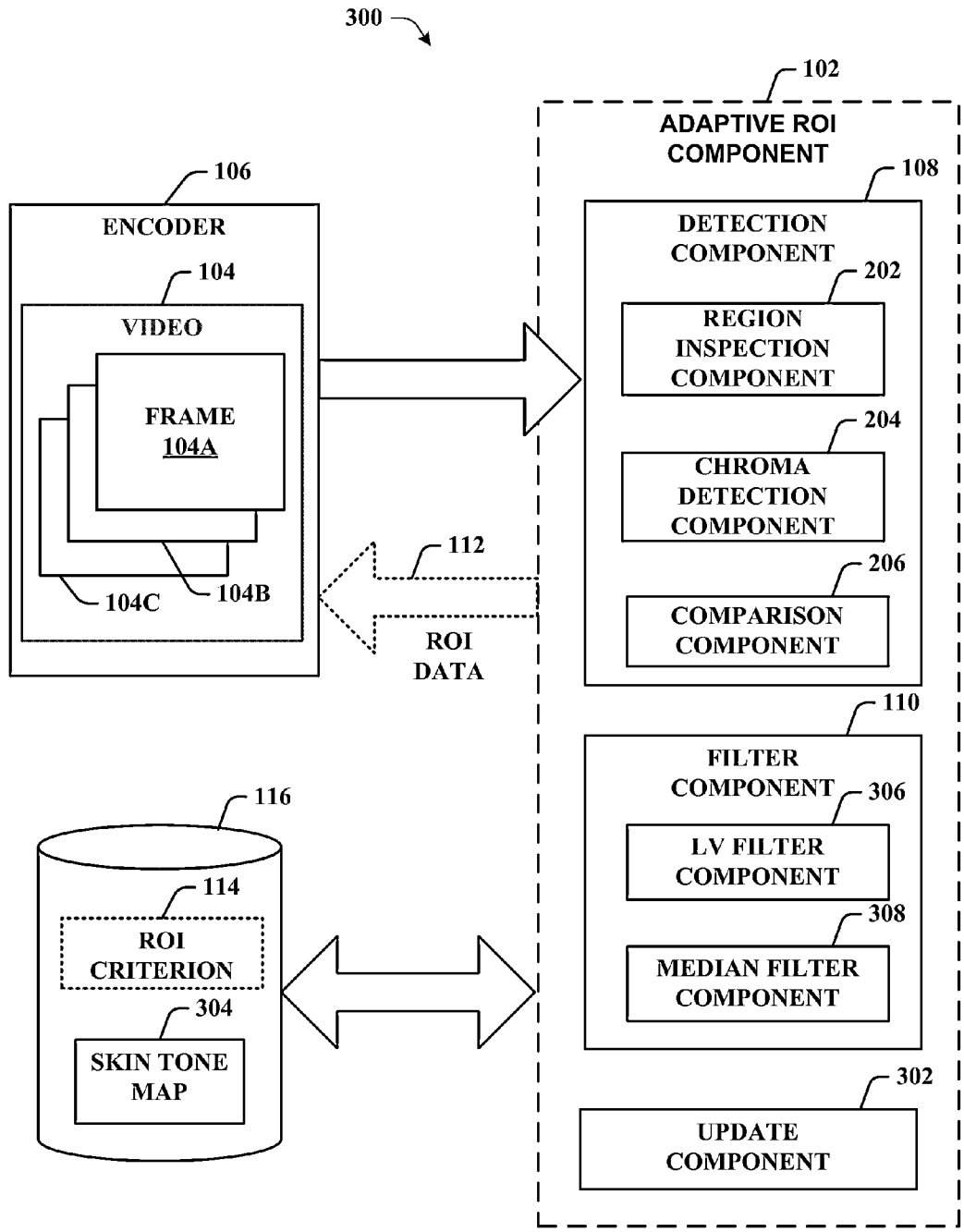
FIG. 3 illustrates an example system for determining regions of interest in images in accordance with various aspects described in this disclosure.

Referring to FIG. 3, illustrated is an example system 300 for adaptively determining regions of interest in images in accordance with various aspects described in this disclosure. The system 300 includes an adaptive region(s) of interest component 102 (ROI component 102). As discussed, the ROI component 102 receives a frame included in a video, and provides data regarding regions of interest (ROI) in the frame to an encoder 106. For example, in an implementation, ROI are regions of the frame corresponding to a human face (e.g., user's face). The ROI component 102 in FIG. 3 includes a detection component 108, a filter component 110, and update component 302.

The detection component 108 in FIG. 3 includes a region inspection component 202, a chroma detection component 204, and a comparison component 206. As discussed, the region inspection component 202 analyzes respective regions of frames. For example, in an implementation, regions of the frame correspond to respective macroblocks, and the region inspection component 202 inspects the respective macroblocks in the frame. The chroma detection component 204 determines chroma values of/included in the respective macroblocks. The comparison component 206 determines macroblocks having chroma values that satisfy the set of ROI criteria 114, and includes the determined macroblocks in a set of potential ROI. For example, the set of ROI criteria 114 in FIG. 3 can include but is not limited to having a chroma value matching one or more chroma values included in a skin tone map 304. For example, in an implementation, the skin tone map 304 is a chart (e.g., plot, graph, etc.) mapping chroma values corresponding to human skin tones (discussed in greater detail with reference to FIG. 5). The comparison component 206 determines macroblocks having chroma values that match one or more chroma values in the skin tone map 304, and includes the macroblocks having chroma values with a match in the set of potential ROI.

As discussed, the filter component 110 filters out regions (e.g., macroblocks) in a set of potential ROI based on a set of filtering criteria, and generates ROI data 112 for the frame based on the filtered set of potential ROI. The filter component 110 in FIG. 3 includes a low variance filter component 306 and a median filter component 308. The low variance filter component 306 (LV filter component 306) filters out regions (e.g., macroblocks) in the set of potential ROI having a variance that does not satisfy a predetermined variance threshold (e.g., low variance), and/or filters out regions having a value within a median absolute deviation (MAD value). A macroblock containing image data associated with a face typically contains details of the face that provide variance in the macroblock. Filtering out macroblocks that do not satisfy a certain variance (e.g., a low variance or a MAD value) can remove macroblocks that are unlikely to be associated with a face.

The median filter component 308 applies a median filter to the set of potential ROI that filters out macroblocks having a quantity of correlating neighbor macroblocks that does not satisfy a predetermined median threshold. For example, in one implementation, the median filter component 308 filters out macroblocks having a quantity of correlating neighbor macroblocks that is less than a predetermined median threshold. The median filter component 308 maintains areas of a frame (e.g., macroblocks) with the most correlating neighbors, and can remove errors created by small areas having limited useable information. The filter component 110 includes macroblocks remaining in the filtered set of potential ROI in a set of regions of interest (ROI). For example, in an implementation, the filter component 110 generates a skin map (e.g., ROI data 112 or using ROI data 112) indicating whether respective macroblocks included in the frame are included in the set of ROI.

The update component 302 updates, revises, or otherwise replaces previously generated ROI data 112, with current ROI data 112 based on a set of update criteria. The update criteria can include but is not limited to a predetermined difference threshold. For example, in an implementation, the ROI data 112 is generated for the first frame 104A included in the video 104, and the ROI data 112 is provided to the encoder 106. The update component 302 compares the ROI data 112 generated for a second frame 104B to the ROI data 112 for the first frame 104A, and if the difference between the ROI data 112 for the first frame 104A and the second frame 104B does not satisfy the predetermined difference threshold, then the update component 302 does not provide the ROI data 112 for the second frame 104B to the encoder 106. Updating and/or signaling the ROI data 112 has a computational expense, and if the ROI are within a difference threshold (e.g., substantially the same in the first frame 104A and the second frame 104B), then the update component 302 does not provide the updated ROI data 112 to the encoder 106. The encoder 106 encodes frames in the video 104 based at least in part on a most recent ROI data 112. For example, if the update component 302 does not provide the ROI data 112 generated for the second frame 104B, then the encoder 106 encodes the second frame 104B based at least in part on a most recent ROI data 112, for example, the ROI data 112 generated for the first frame 104A.

Figure 4:
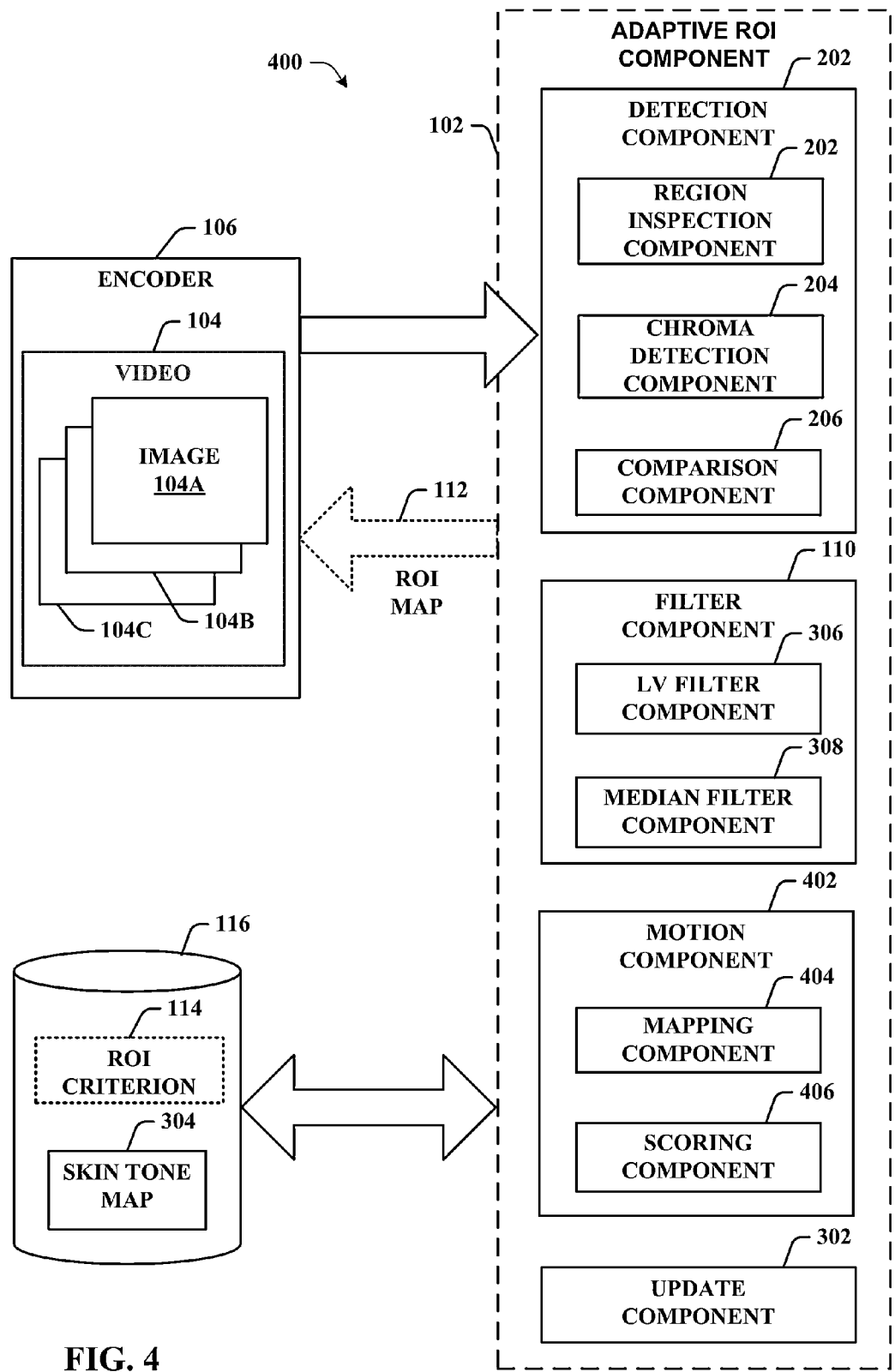
FIG. 4 illustrates an example system for determining regions of interest in images in accordance with various aspects described in this disclosure.

FIG. 4 illustrates an example system 400 for adaptively determining regions of interest in images in accordance with various aspects described in this disclosure. The system 400 includes an adaptive region(s) of interest (ROI) component 102 (ROI component 102). The ROI component 102 receives a frame included in a video 104. The ROI component 102 determines regions of interest (ROI) in the frame. For example, in an implementation, ROI are regions of a frame corresponding to a portion of a human face (e.g., user's face). The ROI component in FIG. 4 includes a detection component 108, a filter component 110, a motion component 402, and an update component 302.

As discussed, the detection component 108 determines potential ROI in the frame. The detection component 108 in FIG. 4 includes a region inspection component 202, a chroma detection component 204, and a comparison component 206. The region inspection component 202 analyzes respective regions of the frames. For example, in an implementation, regions of the frames correspond to respective macroblocks, and the region inspection component 202 inspects the respective macroblocks included in the frame. The chroma detection component 204 determines chroma values of/included in the respective macroblocks. The comparison component 206 determines macroblocks having chroma values that satisfy the set of ROI criteria 114, and includes the determined regions in a set of potential ROI. For example, the set of ROI criteria 114, e.g., in FIG. 4, can include but is not limited to having a chroma value within a range of chroma values defined as skin tones in a skin tone map 304 (discussed in greater detail with reference to FIG. 5). For example, in an implementation, the comparison component 206 includes macroblocks having a chroma value associated with/defined as a skin tone in the skin tone map 304 in a set of potential ROI. During video conferencing users typically focus a camera on users' faces, and macroblocks containing chroma values defined as skin tones are likely to include data associated with a user's face.

The filter component 110 filters the set of potential ROI generated by the chroma detection component 204, and generates a skin map based on the filtered set of potential ROI. The filter component 110 in FIG. 4 includes a low variance filter component 306, and a median filter component 308. The low variance filter component 306 (LV filter component 306) filters out macroblocks having a variance that does not satisfy a predetermined variance threshold and/or filters out macroblocks having a value within a median absolute deviation (MAD value). As discussed, a macroblock associated with a human face will typically contain details of the human face that provide variance, and filtering out macroblocks that have low variance can remove macroblocks that are unlikely to contain details of the face. The median filter component 308 applies a median filter that filters out macroblocks having a quantity of correlating neighbor macroblocks that does not satisfy a predetermined median threshold. For example, in one implementation, the median filter component 308 filters out macroblocks having a quantity of correlating neighbor macroblocks that is less than a predetermined median threshold. As discussed, the median filter component 308 maintains areas of a frame (e.g., macroblocks) having the most correlating neighbors, and can also help reduce potential errors created by small areas having limited useable information. The filter component 110 maps macroblocks included (or remaining) in the filtered set of potential ROI to generate a skin map. The skin map indicates macroblocks included in the frame that are likely to contain data associated with a face (e.g., regions of interest).

The motion component 402 analyzes motion vectors associated with macroblocks included in the frame. The motion component 402 includes a mapping component 404, and a scoring component 406. The mapping component 404 generates a motion map based on the analyzed motion vectors for respective macroblocks included in the frame. For example, in an implementation, when a macroblock is coded with a non-zero motion vector, the mapping component 404 increments, increases, or otherwise adds to a value corresponding to the macroblock in the motion map. The motion map aggregates motion information from multiple frames (e.g., 104A-104C) in the video 104, and indicates areas of the video 104 having high occurrences of motion.

The scoring component 406 scores macroblocks in the frame as a function of the skin map and the motion map, and generates a ROI map (or ROI data 112) using the scores. For example, in an implementation, the scoring component 406 scores macroblocks based on inclusion in the skin map and motion values associated with the macroblocks in the motion map. For instance, if a macroblock is included in the skin map and a motion value associated with the macroblock in the motion map exceeds a predetermined motion threshold, then the macroblock can be scored as a "1" (e.g., true, etc.) in the ROI map. Additionally, if the macroblock is not included in the skin map and/or a motion value associated with the macroblock in the motion map does not exceed the predetermined motion threshold, then the macroblock can be scored as a "0" (e.g., false, etc.) in the ROI map. As an additional or alternative example, in one implementation, the scoring component 406 adjusts, modifies, or otherwise weights the importance of inclusion in the skin map and/or motion values in the motion map based on a set of weighting factors. The weighting factors can include but are not limited to a confidence (e.g., likelihood, etc.) that the skin map is accurate, and/or a confidence (e.g., likelihood, etc.) that motion in the frame is associated with a face. For instance, during a video conference, a camera employed may move an amount exceeding a predetermined camera motion threshold, resulting in a low confidence that the motion in the frame(s) is associated with a face. The scoring component 406 can apply greater importance (e.g., weight) to a macroblock being included in the skin map than to motion values for the macroblock in the motion map when generating the ROI map.

The update component 302 updates, revises, or otherwise replaces a ROI map associated with a first frame, with a ROI map associated with a second frame based on a set of update criteria. The update criteria can include but is not limited to a predetermined difference threshold. For example, in an implementation, the ROI map is generated for the first frame 104A included in a video 104, and provided to the encoder 106. The update component 302 compares a ROI map generated for a second frame 104B to the ROI map, and if the difference between the ROI map generated for the first frame and the ROI map generated for the second frame 104B does not exceed the predetermined difference threshold, then the update component 302 does not communicate the ROI map generated for the second frame 104B to the encoder 106.

The encoder 106 encodes frames in the video 104 based at least in part on a most recent ROI map. For example, the most recent ROI map can be associated with frame 104A, and the encoder 106 can encode frame 104C based in part on the most recent ROI map. For instance, the encoder 106 can encode macroblocks scored as corresponding to a human face (e.g., "1") in the ROI map at a higher, better, or otherwise superior quality to macroblocks scored as not corresponding (e.g., "0") to a human face in the ROI map.

Figure 5:
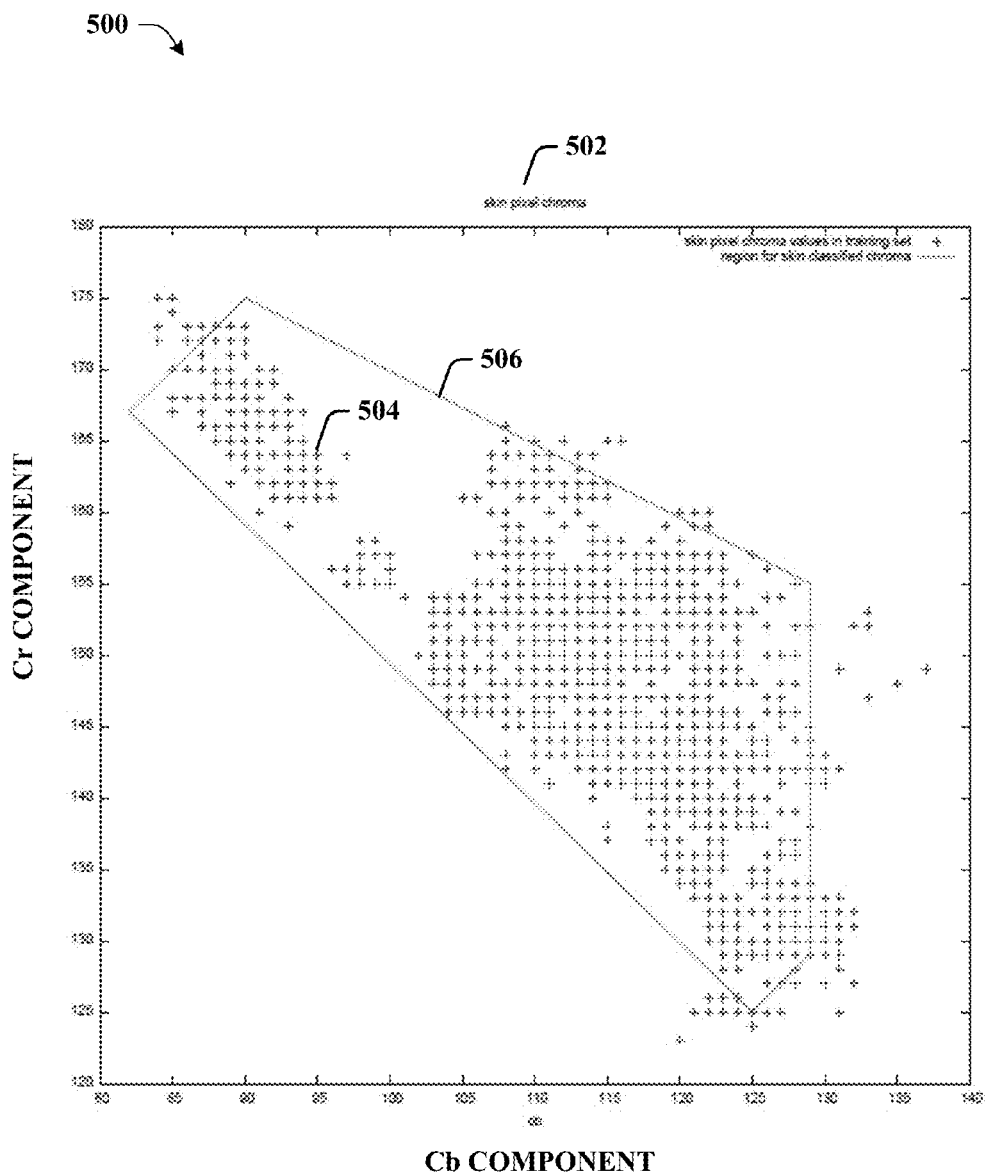
FIG. 5 illustrates a system that provides a non-limiting example of a skin tone map in accordance with various aspects described in this disclosure.

FIG. 5 illustrates a system 500 that provides a non-limiting example of a skin tone map 502 in accordance with various aspects described in this disclosure. The skin tone map 502 is a plot of a set of chroma values 504 corresponding to human skin tones. For example, in an implementation, the set of chroma values 504 are determined from a set of training data. The set of training data includes but is not limited to a set of images of people. In one implementation, the X-axis of the skin tone map 502 represents a blue color difference (e.g., Cb component), and the Y-axis of the skin tone map 502 represents a red color difference (e.g., Cr component). The region 506 represents a region of chroma values defined as skin tones. For example, the region 506 can include the chroma values 504 most commonly associated with a human skin tone, and may not include outlier chroma values that may cause errors.

As discussed, in one implementation, the chroma detection component 204 can compare chroma values included in a macroblock against a skin tone map (e.g., 502), and determine whether the macroblock includes one or more chroma values matching at least one of the chroma values (e.g., 504) and/or whether the macroblock includes one or more chroma values within a region in the skin tone map (e.g., 506) corresponding to human skin tones. During video conferencing users typically focus a camera on a face, and macroblocks containing chroma values associated with skin tones are likely to include a user's face. The chroma detection component 204 can label macroblocks having chroma values matching at least one of the chroma values 504 and/or within the region 506 as potential regions of interest (ROI). It is to be appreciated that the skin tone map 502 is but one example of a skin tone map, and such implementation is not so limited. Additional or alternative skin tone maps can be generated based on different quantities or different types of training data.

Non-Limiting Examples of Methods for Adaptive Determination of Regions of Interest in Images FIGS. 6-9 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Figure 6:
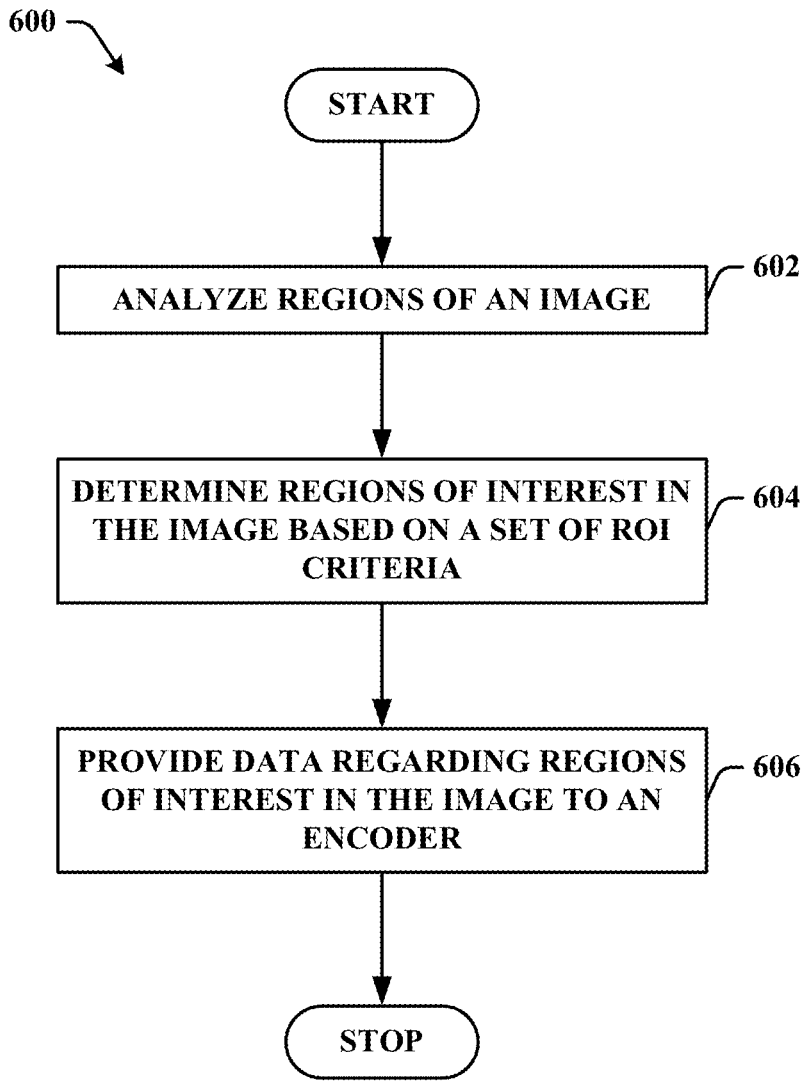
FIGS. 6-9 are example flow diagrams of respective methods for determining regions of interest in images in accordance with various aspects described in this disclosure.

Referring now to FIG. 6, illustrated is an example methodology 600 for region of interest detection in images in accordance with various aspects described in this disclosure. At reference numeral 602, respective regions of an image are analyzed (e.g., using the detection component 108). For example, in an implementation, the image is a first image in a set of images, such as, a video or video conferencing transmission, regions of the image are associated with (e.g., divided into or coded as) respective macroblocks, and the macroblocks are analyzed.

At reference numeral 604, regions of interest in the image are determined based on a set of regions of interest (ROI) criteria (e.g., using the detection component 108). For example, in an implementation, the set of ROI criteria can include matching one or more chroma values corresponding to an object to be detected. Regions of the image containing at least one matching chroma value are determined to be regions of interest (e.g., using the comparison component 206).

At reference numeral 606, data regarding the determined regions of interest in the image are provided to an encoder (e.g., using the ROI component 102). The data can include but is not limited to identifiers (e.g., macroblock identifiers), locations, and/or coordinates of determined regions of interest in the image. For example, in one embodiment, the encoder converts or encodes the image based at least in part on the data regarding the determined regions of interest (e.g., using the encoder 106). For example, the encoder can encode the determined regions of interest in the image at a higher or better quality than a remainder of the image.

Figure 7:
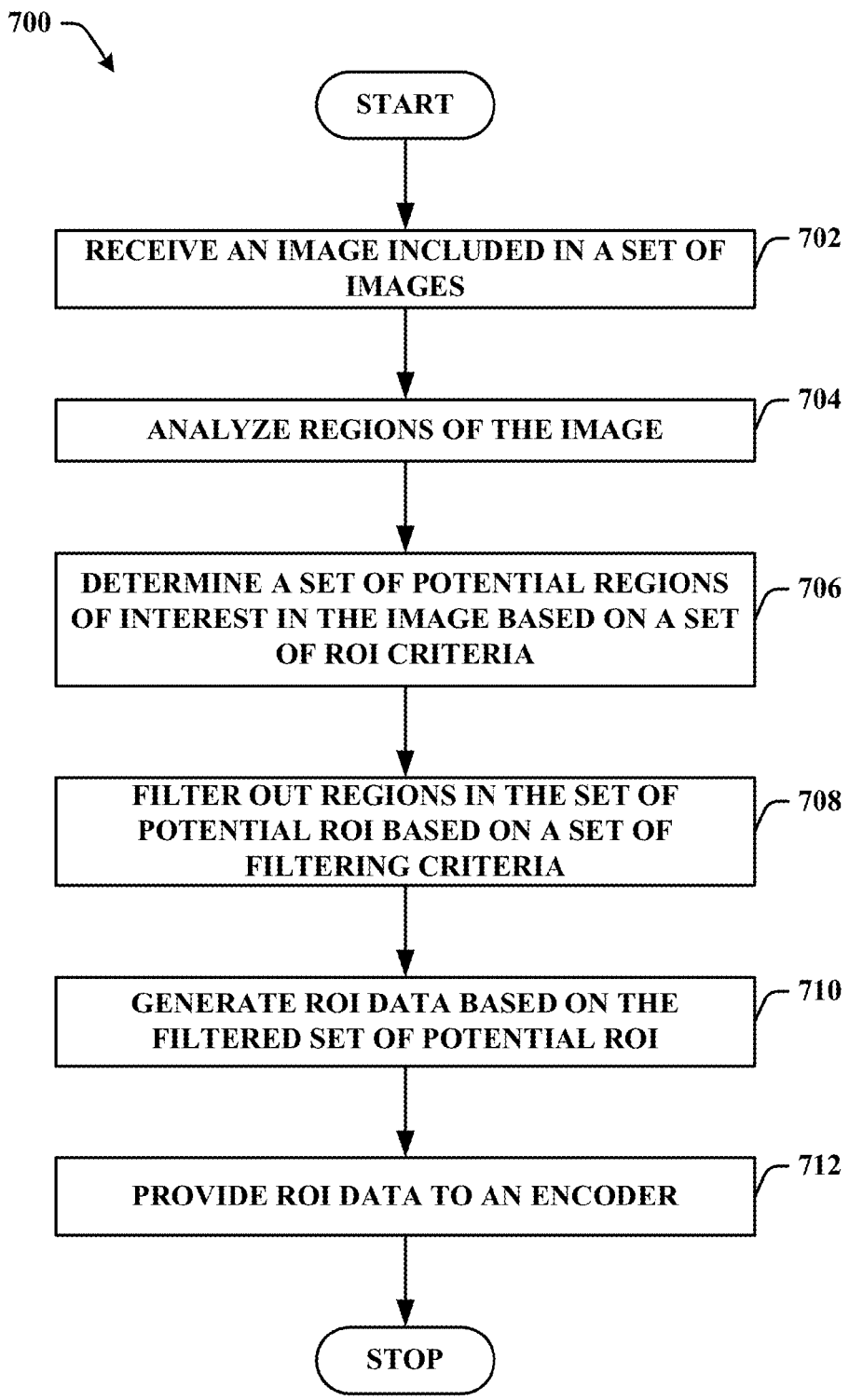

FIG. 7 illustrates an example methodology 700 for region of interest detection in images in accordance with various aspects described in this disclosure. At reference numeral 702, an image included in a set of images is received (e.g., using the ROI component 102). For example, the image can be a frame included in a video or video conferencing transmission. At reference numeral 704, respective regions of the image are analyzed (e.g., using the region inspection component 202). For example, in an implementation, regions of the image are associated with (e.g., divided into or coded as) respective macroblocks and the macroblocks are analyzed.

At reference numeral 706, a set of potential regions of interest in the image is determined based on a set of regions of interest criteria (e.g., using the detection component 108). For example, in an implementation, the set of regions of interest criteria can include matching one or more chroma values corresponding to an object to be detected (e.g., a face). Regions of the image containing at least one matching chroma value are included in the set of potential regions of interest (e.g., using the comparison component 206).

At reference numeral 708, a subset of regions included in the set of potential regions of interest are filtered out based on a set of filtering criteria (e.g., using the filter component 110). For example, in an implementation, the set of filtering criteria includes but is not limited to having a variance satisfying a predetermined variance threshold and/or having a quantity of correlating neighbor regions satisfying a median threshold. For instance, regions having variance below a predetermined threshold can be filtered out (e.g., using the LV filter component 306), and/or regions having a quantity of correlating neighbor blocks below a predetermined threshold can be filtered out (e.g., using the median filter component 308).

At reference numeral 710, a set of regions of interest (ROI) data is generated based on the filtered set of potential regions of interest (e.g., using the filter component 110). The data can include but is not limited to identifiers (e.g., macroblock identifiers), locations, and/or coordinates of determined regions of interest in the image. At reference numeral 712, the set of ROI data is provided to an encoder (e.g., using the ROI component 102). For example, in one embodiment, the encoder converts or encodes the image based at least in part on the ROI data (e.g., using the encoder 106). For instance, the encoder can encode the determined regions of interest in the image at a higher or better quality than a remainder of the image.

Figure 8:
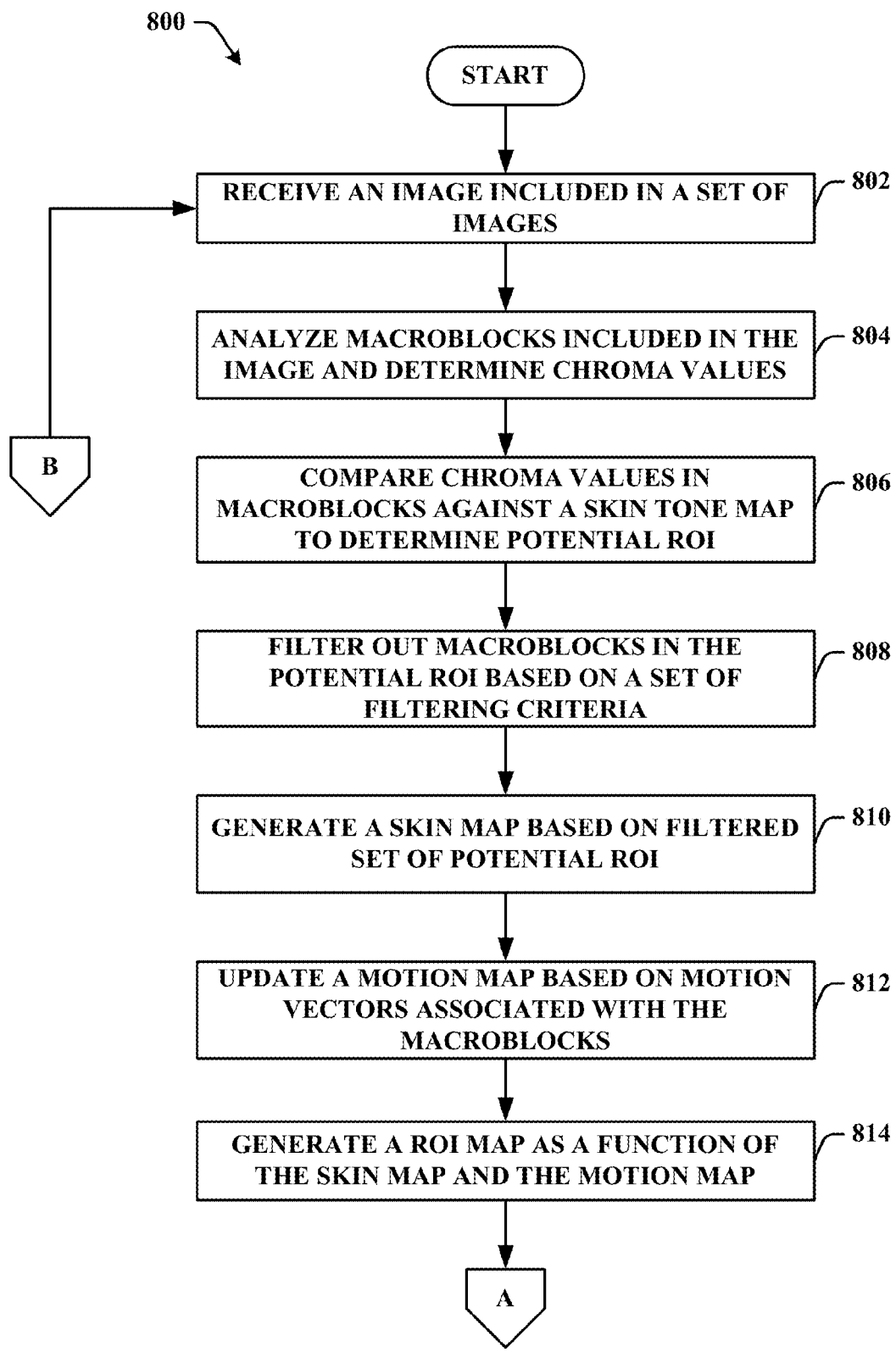

FIG. 8 illustrates an example methodology 800 for region of interest detection in images in accordance with various aspects described in this disclosure. At reference numeral 802, an image included in a set of images is received (e.g., using the ROI component 102). For example, in an implementation, the image is a frame included in a video or video conferencing transmission. At reference numeral 804, macroblocks included in the image are analyzed (e.g., using the region inspection component 202), and chroma values included in the respective macroblocks are determined (e.g., using the chroma detection component 204). At reference numeral 806, the chroma values included in the respective macroblocks are compared against a skin tone map to determine potential regions of interest (ROI) in the image (e.g., using the comparison component 206). For example, in an implementation, macroblocks having chroma values within a region of the skin tone map defined as skin tones are included in a set of potential ROI. During video conferencing users typically focus a camera on one or more faces, for example, and macroblocks containing chroma values associated with skin tones are likely to include the user's face.

At reference numeral 808, a set of macroblocks included in the set of potential ROI are filtered out based on a set of filtering criteria (e.g., using the filter component 110). For example, in an implementation, the set of filtering criteria includes but is not limited to having a variance satisfying a predetermined variance threshold and/or having a quantity of correlating neighbor regions satisfying a median threshold. For instance, macroblocks in the set of potential ROI having a variance below the predetermined variance threshold can be filtered out (e.g., using the LV filter component 306), and/or macroblocks in the set of potential ROI having a quantity of correlating neighbor blocks below the predetermined median threshold can be filtered out (e.g., using the median filter component 308). As discussed, filtering out small areas of the image having few correlating neighbor macroblocks can help reduce errors created by small areas of the image containing limited useful information. At reference numeral 810, a skin map is generated based on the filtered set of potential ROI (e.g., using the filter component 110). For example, in on implementation, macroblocks included (or remaining) in the filtered set of potential ROI are mapped to generate the skin map. The skin map indicates macroblocks included in the frame that are likely to contain data associated with a face (e.g., regions of interest).

At reference numeral 812, a motion map is updated based on motion vectors associated with macroblocks included in the image (e.g., using the mapping component 404). For example, in an implementation, when a macroblock is coded with a non-zero motion vector, a value corresponding to the macroblock in the motion map is increased (e.g., incremented, etc). The motion map aggregates motion information from multiple images in the set of images, and indicates areas included in the set of images having the greatest occurrences of motion. As discussed, during video conferencing users typically focus a camera on one or more faces, and the areas having the greatest occurrences of motion are likely associated with a portion of a user's face.

At reference numeral 814, a regions of interest (ROI) map is generated as a function of the skin map and motion map (e.g., using the scoring component 406). For example, in an implementation, macroblocks are scored based on inclusion in the skin map and motion values associated with the macroblocks in the motion map. For instance, if a macroblock is included in the skin map, and a motion value associated with the macroblock in the motion map exceeds a predetermined motion threshold, then the macroblock can be scored as a "1"

(e.g., true, etc.) in the ROI map. Additionally or alternatively, if the macroblock is not included in the skin map, and/or a motion value associated with the macroblock in the motion map does not exceed the predetermined motion threshold, then the macroblock can be scored as a "0" (e.g., false, etc.) in the ROI map.

As an additional or alternative example, in one implementation, the importance of inclusion in the skin map and/or motion values in the motion map is weighted based on a set of weighting factors (e.g., using the scoring component 406). The weighting factors can include but are not limited to a confidence (e.g., likelihood, etc.) that the skin map is accurate, and/or a confidence (e.g., likelihood, etc.) that motion in the frame is associated with a face. For instance, during a video conference, a camera employed may move an amount exceeding a predetermined camera motion threshold, resulting in a low confidence that motion in the frame(s) is associated with a face. A greater importance (e.g., weight) can be applied to inclusion in the skin map than to motion values in the motion map when generating the ROI map.

Figure 9:
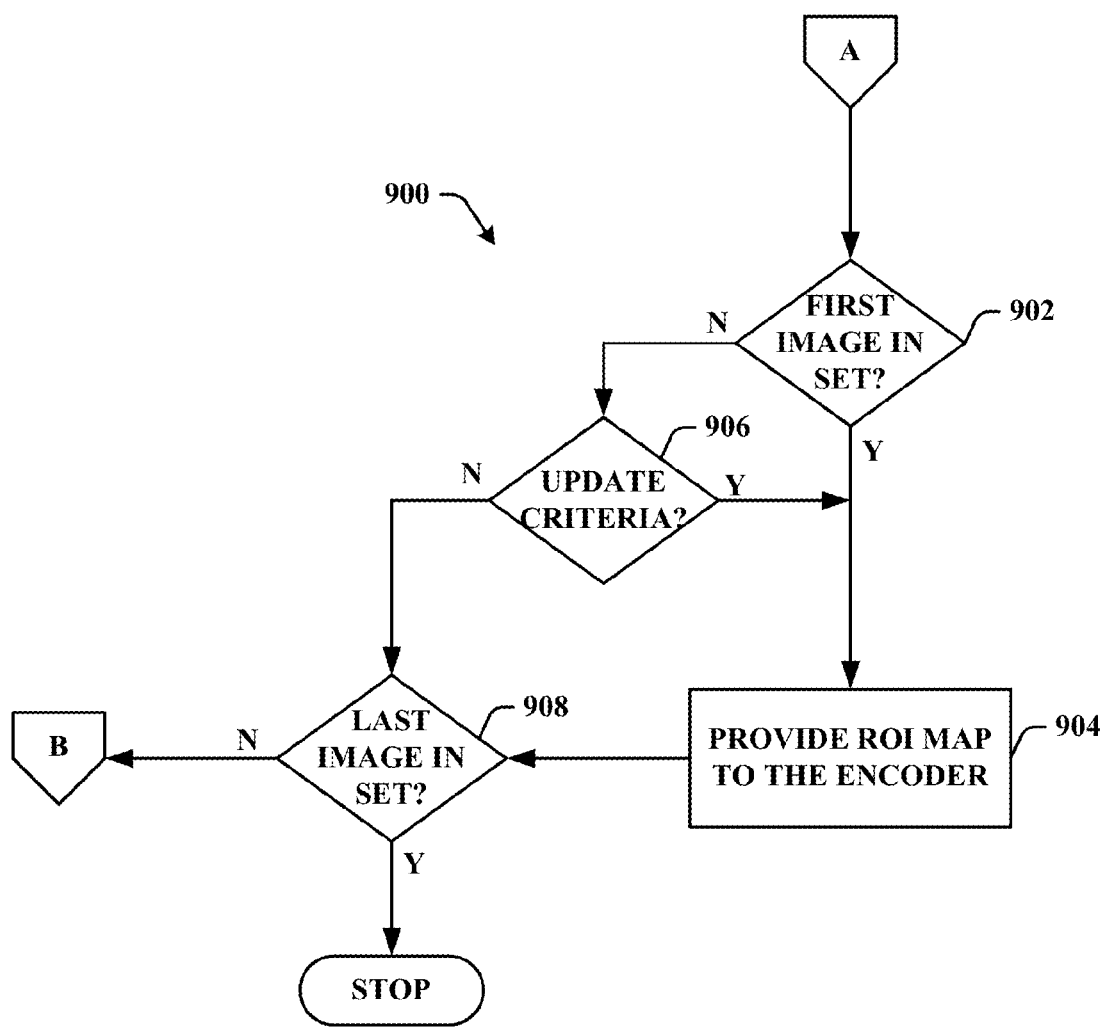

FIG. 9 illustrates an example methodology 900 for region of interest detection in images in accordance with various aspects described in this disclosure. At reference numeral 902, a determination is made whether the image (e.g., the image received at reference numeral 802) is the first image in the set of images. If it is determined that the image is the first image in the set of images (Y at reference numeral 902), then, at reference numeral 904, the ROI data is provided to an encoder (e.g., using the update component 302), and the methodology advances to reference numeral 908.

Returning to reference numeral 902, if it is determined that the image is not the first image in the set of images (N at reference numeral 902), then a determination is made whether the ROI map satisfies a set of update criteria at reference numeral 906 (e.g., using the update component 302). The update criteria can include but is not limited to a difference threshold. For example, in an implementation, a ROI map is generated for a first image included in a video, and provided to the encoder. Another ROI map generated for a second image is compared to the ROI map for the first image, and if the difference between the ROI maps generated for the first image and the second image does not satisfy the difference threshold, then the ROI map for the second image is not provided to the encoder. Updating and/or signaling the ROI map can have a computational expense, and if the ROIs are substantially the same in the first image and the second image, then the latter ROI map is not provided to the encoder. If it is determined that the ROI map does not satisfy the update criteria (N at reference numeral 906), then the ROI map is not provided to the encoder (e.g., using the update component 302), and the methodology advances to reference numeral 908. If it is determined that the ROI map satisfies the update criteria (Y at reference numeral 906), then the latter ROI map is provided to the encoder (e.g., using the update component 302) at reference numeral 904, and the methodology advances to reference numeral 908.

At reference numeral 908, a determination is made whether the image is the last image in the set of images. If it is determined that the image is the last image in the set of images (Y at reference numeral 908), then the methodology terminates. If it is determined that the image is not the last image in the set of images (N at reference numeral 908), then another image is processed (e.g., starting at reference numeral 802).

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 10:
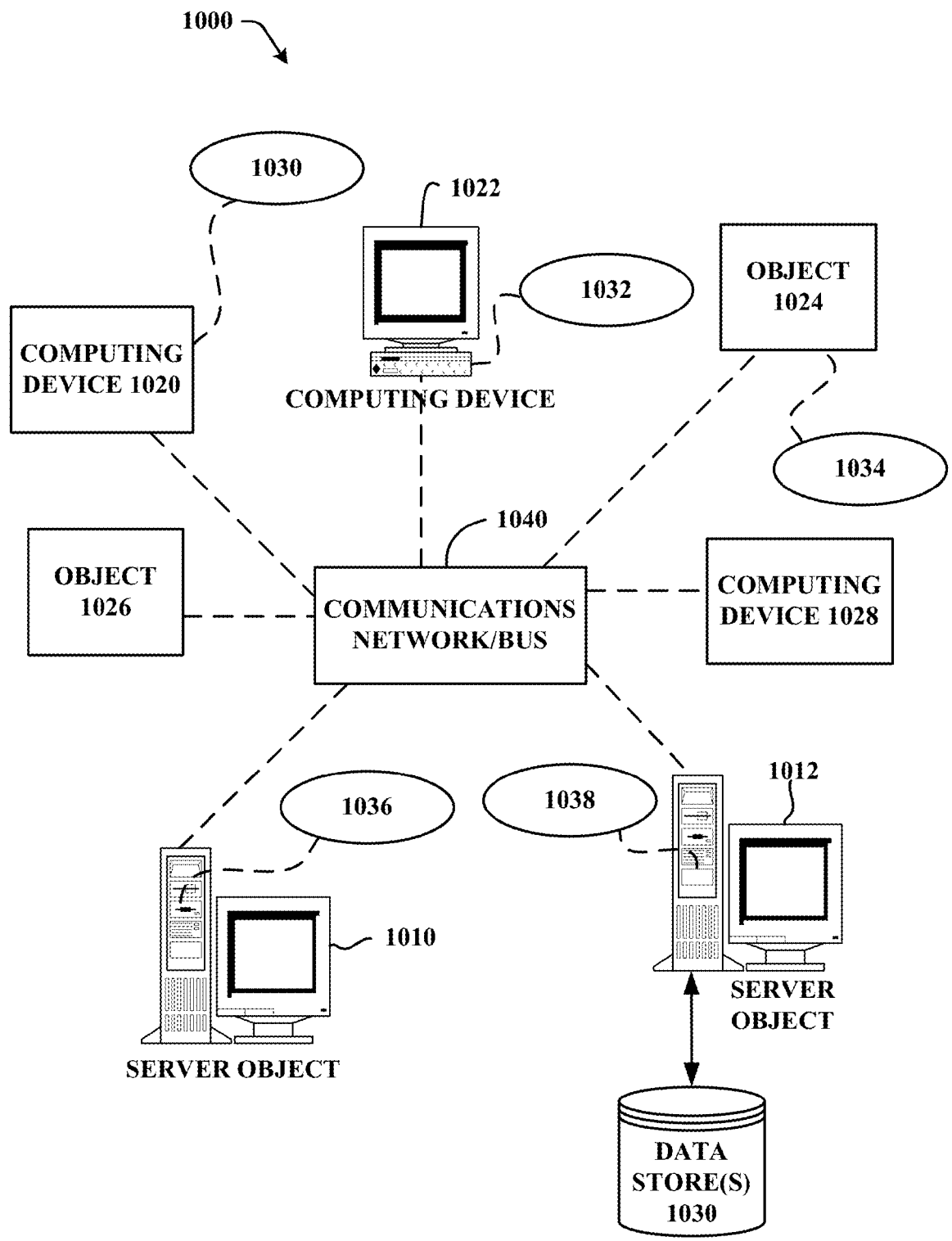
FIG. 10 is a block diagram representing an exemplary non-limiting networked environment in which the various embodiments can be implemented.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be appreciated that computing objects 1010, 1012, etc. and computing objects or devices 1020, 1022, 1024, 1026, 1028, etc. may comprise different devices, such as personal data assistants (PDAs), audio/video devices, mobile phones, MP3 players, personal computers, tablets, laptops, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, network 1040 may comprise other computing objects and computing devices that provide services to the system of FIG. 10, and/or may represent multiple interconnected networks, which are not shown. Each computing object 1010, 1012, etc. or computing objects or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc. provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1040 is the Internet, for example, the computing objects 1010, 1012, etc. can be Web servers with which the client computing objects or devices 1020, 1022, 1024, 1026, 1028, etc. communicate via any of a number of known protocols, such as the hypertext transfer protocol (HTTP). Objects 1010, 1012, etc. may also serve as client computing objects or devices 1020, 1022, 1024, 1026, 1028, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 11 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 11:
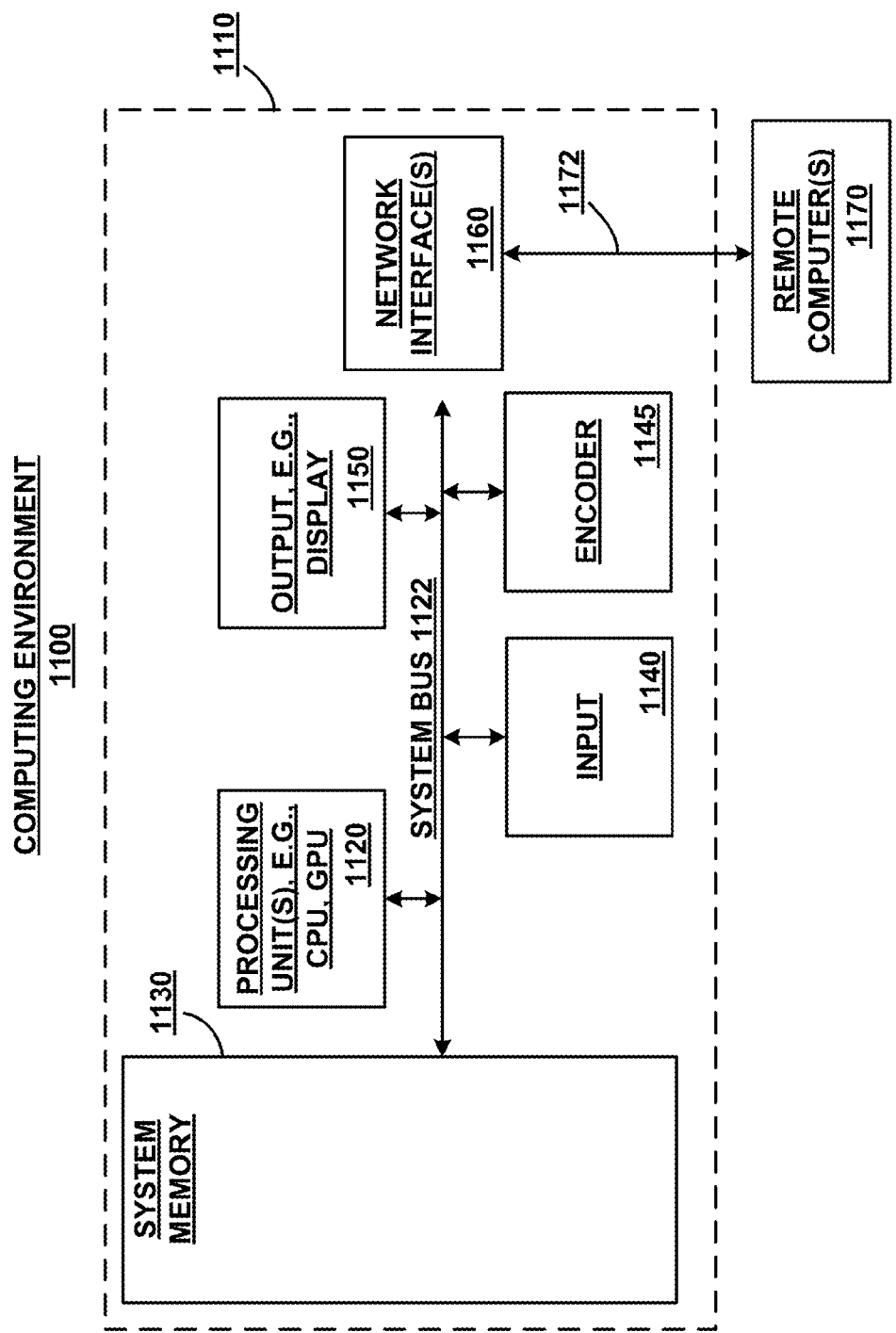
FIG. 11 is a block diagram representing an exemplary non-limiting computing system or operating environment in which the various embodiments may be implemented.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither is the computing environment 1100 be interpreted as having any dependency or requirement relating to any one or combination of components illustrated in the exemplary operating environment 1100.

With reference to FIG. 11, an exemplary remote device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, memory 1130 may also include an operating system, application programs, other program modules, and program data.

A user can enter commands and information into the computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150. An encoder 1145 is also connected to the system bus 1122. The encoder 1145 enables compression and/or decompression of digital data, such as digital video. The encoder 1145 accepts video data in, and converts video data to, virtually any digital format, including but not limited to MPEG-1 and 2 (MPG), QUICKTIME™ (MOV), REALMEDIA™, WINDOWS MEDIA™ (WMV), H.264 (MP4), DIVX™ and Xvid (AVI), FLASH VIDEO™ (FLV), Matroska Multimedia Container (MKV), Theora (OGG), 3GP, Video Object (VOB), and/or WebM™.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements. Furthermore, reference throughout this disclosure to "one implementation" or "an implementation" or "one embodiment" or "an embodiment" means that a particular feature, structure, or characteristic described in connection with the implementation or embodiment is included in at least one implementation or embodiment. Thus, the appearances of the phrase "in one implementation" or "in an implementation" or "in one embodiment" or "in an embodiment" in various places throughout this specification are not necessarily all referring to the same implementation or embodiment.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method comprising:
generating, by a processor in response to instructions stored on a non-transitory computer readable medium, an encoded frame by encoding a current input frame from a plurality of frames of an input video stream, wherein encoding the current input frame includes:
identifying a current block from the current input frame,
determining a first chrominance value for the current block,
determining a second chrominance value for the current block,
determining whether the current block is a skin tone block, wherein the current block is a skin tone block on a condition that the first chrominance value intersects with the second chrominance value within a skin tone area in a chrominance map, and on a condition that an aggregate color value of the current block exceeds a filtering threshold, and on a condition that a cardinality of a plurality of neighboring skin tone blocks exceeds a spatial threshold, and wherein determining whether the current block is a skin tone block includes determining whether the first chrominance value intersects with the second chrominance value within the skin tone area in the chrominance map, wherein determining whether the first chrominance value intersects with the second chrominance value within the skin tone area in the chrominance map includes:
identifying a first chrominance range based on the first chrominance value;
identifying a second chrominance range based on the second chrominance value;
on a condition that the first chrominance value is within the second chrominance range and on a condition that the second chrominance value is within the first chrominance range, determining that the first chrominance value intersects with the second chrominance value within the skin tone area in the chrominance map;

on a condition that the first chrominance value is outside the second chrominance range, determining that the first chrominance value intersects with the second chrominance value outside the skin tone area in the chrominance map; and on a condition that the second chrominance value is outside the first chrominance range, determining that the first chrominance value intersects with the second chrominance value outside the skin tone area in the chrominance map, determining whether to include the current block in a region of interest for the current input frame based on whether the current block is a skin tone block and whether the current block spatially corresponds with a motion block in a motion map, wherein the motion map represents motion identified for at least one previously coded frame, encoding the current block using region of interest information identifying the region of interest for the current input frame on a condition that a difference between the region of interest for the current input frame and a region of interest for the at least one previously coded frame exceeds an update threshold, wherein encoding the current block includes including information identifying the region of interest for the current input frame in an output bitstream, encoding the current block using region of interest information identifying the region of interest for the at least one previously coded frame on a condition that the difference between the region of interest for the current input frame and the region of interested for the at least one previously coded frame is within the update threshold, and including the encoded block in the output bitstream; and transmitting or storing the output bitstream.

2. The method of claim 1, wherein encoding the current input frame includes identifying the skin tone chrominance map based on a plurality of training frames, wherein the input video sequence does not include the plurality of training frames.

3. The method of claim 1, wherein encoding the current input frame includes identifying the skin tone chrominance map based on a plurality of training frames, wherein the input video sequence does not include the plurality of training frames, and wherein a training frame from the plurality of training frames includes a training skin tone pixel such that the skin tone chrominance map does not include an intersection of chrominance values of the training skin tone pixel.

4. The method of claim 1, wherein the aggregate color value of the current block exceeds the filtering threshold on a condition that a color variance of the current block is greater than a minimum color variance.

5. The method of claim 1, wherein the aggregate color value of the current block exceeds the filtering threshold on a condition that a median absolute deviation of the current block is greater than a minimum median absolute deviation.

6. The method of claim 1, wherein encoding the current input frame includes identifying the motion map by:

updating a motion value of a block from the motion map on a condition that a motion vector for a spatially corresponding block from the at least one previously coded frame is a non-zero motion vector.

7. The method of claim 1, wherein the motion map is a cumulative motion map that indicates at least one spatial area of motion for the current input frame based on motion information generated for the at least one previously coded frame.

8. The method of claim 1, wherein determining whether to include the current block in the region of interest for the current input frame includes:

determining a region of interest score for the current block; and including the current block in the region of interest for the current input frame on a condition that the region of interest score exceeds a region of interest threshold.

9. The method of claim 8, wherein determining the region of interest score includes:

determining a skin map block score;

determining a motion block score; and determining a sum of the skin map block score and the motion block score as the region of interest score.

10. The method of claim 9, wherein the skin map block score is zero on a condition that the current block is not a skin tone block and the skin map block score is a skin map weight on a condition that the current block is a skin tone block.

11. The method of claim 9, wherein the motion block score is zero on a condition that the current block does not spatially correspond with a motion block from the motion map and the motion block score is a motion weight on a condition that the current block spatially corresponds with a motion block from the motion map.

12. The method of claim 1, wherein encoding the current input frame includes:

determining the difference between the region of interest for the current input frame and the region of interest for the at least one previously coded frame based a size of the region of interest for the current input frame, a size of region of interest for the at least one previously coded frame, a proportion of skin map blocks in the region of interest for the current input frame relative to the size of the region of interest for the current input frame, or a proportion of skin map blocks in the region of interest for the at least one previously coded frame relative to the size of the region of interest for the at least one previously coded frame.

13. A method comprising:

generating a first region of interest based on a first frame from a first input video stream;

generating a first motion map representing motion identified for the first frame;

generating a first encoded frame by encoding the first frame based on the first region of interest;

including information identifying the first region of interest in an output bitstream;

including the first encoded frame in the output bitstream;

identifying a second frame from the input video stream;

generating, by a processor in response to instructions stored on a non-transitory computer readable medium, a second encoded frame by encoding the second frame, wherein encoding the second frame includes:

identifying a current block from the second frame, determining a first chrominance value for the current block, determining a second chrominance value for the current block, determining whether the current block is a skin tone block, wherein the current block is a skin tone block on a condition that the first chrominance value intersects with the second chrominance value within an identified skin tone area in a chrominance map, and on a condition that an aggregate color value of the current block exceeds a filtering threshold, and on a condition that a cardinality of a plurality of neighboring skin tone blocks from the second frame exceeds a spatial threshold, wherein determining whether the current block is a skin tone block includes determining whether the first chrominance value intersects with the second chrominance value within the identified skin tone area in the chrominance map, wherein determining whether the first chrominance value intersects with the second chrominance value within the identified skin tone area in the chrominance map includes:
 identifying a first chrominance range based on the first chrominance value;
 identifying a second chrominance range based on the second chrominance value;
 on a condition that the first chrominance value is within the second chrominance range and on a condition that the second chrominance value is within the first chrominance range, determining that the first chrominance value intersects with the second chrominance value within the identified skin tone area in the chrominance map;
 on a condition that the first chrominance value is outside the second chrominance range, determining that the first chrominance value intersects with the second chrominance value outside the identified skin tone area in the chrominance map; and
 on a condition that the second chrominance value is outside the first chrominance range, determining that the first chrominance value intersects with the second chrominance value outside the identified skin tone area in the chrominance map,
generating a second motion map based on the first motion map and the second frame,
generating a second region of interest based on the second frame, wherein generating the second region of interest includes determining whether to include the current block in the second region of interest based on whether the current block is a skin tone block and whether the current block spatially corresponds with a motion block in the second motion map,
determining whether to encode the current block using the first region of interest or the second region of interest,
encoding the current block using the second region of interest on a condition that a difference between the second region of interest and the first region of interest exceeds an update threshold, wherein encoding the current block includes including information identifying the second region of interest in the output bitstream,
encoding the current block using the first region of interest on a condition that the difference between the second region of interest and the first region of interest is within the update threshold, and
including the second encoded block in the output bitstream; and transmitting or storing the output bitstream.

14. The method of claim 13, wherein the aggregate color value of the current block exceeds the filtering threshold on a condition that a color variance of the current block is greater than a minimum color variance or on a condition that a median absolute deviation of the current block is greater than a minimum median absolute deviation.

15. The method of claim 13, wherein determining whether to include the current block in the second region of interest includes:
 determining a skin map block score, wherein the skin map block score is zero on a condition that the current block is not a skin tone block and the skin map block score is a skin map weight on a condition that the current block is a skin tone block;
 determining a motion block score, wherein the motion block score is zero on a condition that the current block does not spatially correspond with a motion block from the second motion map and the motion block score is a motion weight on a condition that the current block spatially corresponds with a motion block from the second motion map; and
 including the current block in the second region of interest on a condition that a sum of the skin map block score and the motion block score exceeds a region of interest threshold.

16. The method of claim 13, wherein encoding the second frame includes determining the difference between the second region of interest and the first region of interest based a size of the second region of interest, a size of the first region of interest, a proportion of skin map blocks in the second region of interest relative to the size of the second region of interest, or a proportion of skin map blocks in the first region of interest relative to the size of the first region of interest.

17. A method comprising:
 generating, by a processor in response to instructions stored on a non-transitory computer readable medium, an encoded frame by encoding a current frame from an input video stream, the current frame including a plurality of blocks, wherein encoding the current frame includes:
  generating a motion map for the current frame based on a respective motion vector for each block from the plurality of blocks and motion information identified for at least one previously coded frame,
  generating a tone map for the current frame, wherein generating the tone map includes:
   identifying a subset of blocks from the plurality of blocks, wherein each block from the subset of blocks has chrominance values that intersect within a defined skin tone area in a chrominance map, wherein identifying the subset of blocks includes:
    for each block from the subset of blocks, determining whether a first chrominance value for the block intersects with a second chrominance value for the block within the skin tone area in the chrominance map, wherein determining whether the first chrominance value intersects with the second chrominance value within the skin tone area in the chrominance map includes:
     identifying a first chrominance range based on the first chrominance value;
     identifying a second chrominance range based on the second chrominance value;
     on a condition that the first chrominance value is within the second chrominance range and on a condition that the second chrominance value is within the first chrominance range, determining that the first chrominance value intersects with the second chrominance value within the skin tone area in the chrominance map;
     on a condition that the first chrominance value is outside the second chrominance range, determining that the first chrominance value intersects with the second chrominance value outside the skin tone area in the chrominance map; and
on a condition that the second chrominance value is outside the first chrominance range, determining that the first chrominance value intersects with the second chrominance value outside the skin tone area in the chrominance map;

filtering the subset of blocks based on a color filtering threshold; and identifying a spatial group of blocks from the subset of blocks, such that a cardinality of the spatial group of blocks exceeds a spatial threshold, such that the tone map identifies the spatial group of blocks;

identifying a region of interest for the current frame based on the motion map and the tone map, including information identifying the region of interest for the current frame in an output bitstream on a condition that a difference between the region of interest for the current frame and a region of interest for a previously coded frame exceeds an update threshold, and including the encoded block in the output bitstream; and
transmitting or storing the output bitstream.

* * * * *